United States Patent [19]

Flanigen et al.

[11] 3,915,893

[45] Oct. 28, 1975

[54] AMORPHOUS HYDROCARBON CONVERSION CATALYSTS AND PROCESS FOR PREPARING SAME

[75] Inventors: Edith Marie Flanigen, White Plains; Robert William Grose, Mahopac, both of N.Y.

[73] Assignee: Union Carbide Corporation, New York, N.Y.

[22] Filed: July 24, 1973

[21] Appl. No.: 382,152

Related U.S. Application Data

[63] Continuation-in-part of Ser. No. 192,347, Oct. 26, 1971, abandoned, which is a continuation of Ser. No. 774,869, Nov. 12, 1968, abandoned, Continuation-in-part of Ser. No. 192,344, Oct. 26, 1971, abandoned, which is a continuation of Ser. No. 775,189, Nov. 12, 1968, abandoned.

[52] U.S. Cl. ............... 252/437; 252/438; 252/440; 260/524 R; 260/599; 260/641; 260/667; 260/669 R; 260/671 C; 260/672 R; 260/682; 260/683.3; 260/683.65
[51] Int. Cl.............................................. B01j 11/82
[58] Field of Search..................... 252/437, 438, 440

[56] References Cited
UNITED STATES PATENTS

| | | | |
|---|---|---|---|
| 2,380,617 | 7/1945 | Stewart et al.................. | 252/440 X |
| 2,786,758 | 3/1957 | Taylor............................ | 252/440 X |
| 3,156,657 | 11/1964 | Pinder et al. ....................... | 252/440 |
| 3,219,590 | 11/1965 | Ribaud.............................. | 252/446 |
| 3,236,762 | 2/1966 | Rabo et al................... | 252/455 Z X |
| 3,260,680 | 7/1966 | Sanford et al. ................. | 252/440 X |
| 3,436,176 | 4/1969 | Spedden et al. .................... | 423/120 |

*Primary Examiner*—Patrick P. Garvin
*Attorney, Agent, or Firm*—R. G. Miller

[57] ABSTRACT

Novel amorphous compositions possessing catalytic properties may be prepared by controlled calcination of synthetic crystalline precursor material structurally related to the mineral alunite, said precursor material being prepared and crystallized from an aqueous reaction mixture having a composition expressed in terms of mole ratios of oxides as $q\ G_2O : a\ Al_2O_3 : b\ M_2O_3 : c\ SO_4 : d\ XO_4 : e\ H_2O$ wherein "G" represents $NH_4^+$, $H^+$, $Ag^+$ or any mixture thereof, wherein $M_2O_3$ represents at least one oxide selected from the group consisting of $Fe_2O_3$, $Cr_2O_3$, $V_2O_3$, $La_2O_3$, and $Ce_2O_3$; $XO_4$ represents at least one oxide selected from the group consisting of $PO_4$, $MoO_4$, $VO_4$, $SiO_4$ and $TlO_4$; "$q$" has a value of from 0.5 to 6.0; "$a$" has a value of from 1.5 to 4.0; "$b$" has a value of from zero to 2.0; "$c$" has a value of from 8.0 to 10.0; "$d$" has a value of from zero to 2.0; "$e$" has a value of from 100 to 1,000; the sum of "$a$" + "$b$" has a value not exceeding 4.0.

2 Claims, No Drawings

AMORPHOUS HYDROCARBON CONVERSION CATALYSTS AND PROCESS FOR PREPARING SAME

RELATED APPLICATIONS

This application is a continuation-in-part of pending application Ser. No. 192,347, filed Oct. 26, 1971 and now abandoned which is in turn a continuation of application Ser. No. 774,869, filed Nov. 12, 1968 and now abandoned. This application is also a continuation-in-part of pending application Ser. No. 192,344, filed Oct. 26, 1971 and now abandoned which is in turn a continuation of application Ser. No. 775,189 filed Nov. 12, 1968 and now abandoned.

This invention relates to novel amorphous heterogeneous catalysts which are especially useful hydrocarbon conversion reactions and which are derived from synthetic crystalline material structurally related to the mineral alunite.

It has been known for some time that aluminas and aluminosilicates could catalyze hydrocarbon cracking and that certain metal-loaded forms thereof were useful as hydrocarbon reforming catalysts; but it has been found that alunite, $[KAl_3(OH)_6(SO_4)_2]$, and $[NaAl_3(OH)_6(SO_4)_2]$, a synthetic phase structurally related to alunite, have no catalytic activity in hydrocarbon conversion reactions such as hydrogenation and alkylation.

It is the general object of this invention to provide novel amorphous compositions useful as catalysts, particularly in hydrocarbon conversion processes.

Another object is to provide a method for preparing the novel materials of this invention.

The synthetic crystalline materials from which the novel catalyst materials of this invention are obtained by calcination can be prepared by providing an aqueous reaction mixture having a composition expressed in terms of mole ratios of oxides as $q\ G_2O : a\ Al_2O_3 : b\ M_2O_3 : c\ SO_4 : d\ XO_4 : e\ H_2O$ wherein "G" represents $NH_4^+$, $Ag^+$ or $H_3O^+$ or any mixture thereof, wherein $M_2O_3$ represents at least one oxide selected from the group consisting of $Fe_2O_3$, $Cr_2O_3$, $V_2O_3$, $La_2O_3$ and $Ce_2O_3$; $XO_4$ represents at least one oxide selected from the group consisting of $PO_4$, $MoO_4$, $VO_4$, $SiO_4$ and $TlO_4$; $q$ has a value of from 0.5 to 6.0; $a$ has a value of from 1.5 to 4.0; $b$ has a value of from zero to 2.0; $c$ has a value of from 8.0 to 10.0; $d$ has a value of from zero to 2.0; $e$ has a value of from 100 to 1,000; the sum of $a+b$ has a value not exceeding 4.0; establishing the pH of said reaction mixture in the range of 1.5 to 4.5, digesting said aqueous reaction mixture within a temperature range of from about 80 to about 200°C for a period of from at least about 4 hours to a period sufficient to complete crystallization, washing with water and recovering the crystalline reaction product.

Such reaction products are crystalline phases structurally related to alunite, but are free of alkali metal cations which are present in the mineral forms of alunite.

In forming the aforesaid reaction mixture, ammonium hydroxide and the water soluble salts of aluminum, iron, chromium, vanadium, lanthanum and thallium such as their respective chlorides, sulfates, nitrates, acetates and the like are preferred. In a preferred form of this invention concentrated ammonium hydroxide is added to an aqueous aluminosulfate solution. In those cases where the reagents do not impart the necessary amount of sulfate to the reaction mixture, sulfuric acid can be added in appropriate amount. The water soluble compounds of $PO_4$, $MoO_4$, $VO_4$ and $SiO_4$ are also preferred such as the acids which contain these moieties, for example $H_3PO_4$. The necessary pH of the reaction mixture of from 1.5 to 4.5 can result from the particular combination of reagents chosen, or if too high the pH can be lowered by the addition of simple inorganic or organic acids such as hydrochloric, nitric or acetic acid. The reaction mixture should be kept free of alkali metal cations.

A suitable temperature range for digestion is from ambient to about 200°C but as a practical matter a temperature should be chosen which is suitable to yield a useful amount of precursor material within a resonable time. Digestion should take place for a period from about 4 to 24 hours. Pressure is not a significant factor. Digestion at 100°C for about 21 hours is particularly preferred.

The synthetic phases structurally related to alunite such as those resulting from the aforesaid preparation process, which are precursors for the novel catalysts of this invention are, generally speaking, a class of crystalline materials having the crystal structure of the potassium compound $K[Al_3(OH)_6][SO_4]$ to which the name alunite strictly belongs but which comprise the modifications thereof resulting from isomorphous replacement of various crystallographic units, both of the simple kind wherein $[Fe_3(OH)_6]$ replaces $[Al_3(OH)_6]$ and/or $NH_4^+$ or $H^+$ ($H_3O^+$) replaces $K^+$ and also of the compensatory type of replacement such as $SO_4$ by $PO_4$ with appropriate valence balancing. The alunite structures are characterized by a three-dimensional framework made up of linked $AlO_2(OH)_4$ octahedra and $SO_4$ tetrahedra. Each Al is coordinated to four OH groups and shares two oxygen ions with two sulfate groups. Three oxygen ions in every $SO_4$ group are bonded to an Al ion and one oxygen to a sulfur ion. In the mineral alunite the cation K is in a "cage" in the structure coordinated to six oxygen ions and six hydroxyl groups. For purposes of the present invention the "cage" alkali metal cation of the synthetic crystalline precursor is functionally displaced by a cation other than alkali metal and preferably by a non-metal cation, particuarly $NH_4^+$ or $H_3O^+$ (perhaps $H^+$) or any mixture thereof. Hereinafter in the specification and claims the term "cage cation" shall denote the cation which physically or functionally occupies the site ordinarily occupied by the $K^+$ cation in the mineral alunite.

The particular synthetic phases related to alunite which result from the particular process set forth above have compositions expressed in terms of mole ratios of oxides as

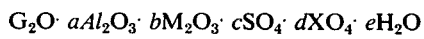

$G_2O \cdot aAl_2O_3 \cdot bM_2O_3 \cdot cSO_4 \cdot dXO_4 \cdot eH_2O$ wherein G represents $NH_4^+$, $H_3O^+$ or Ag and wherein $M_2O_3$ represents $Fe_2O_3$, $Cr_2O_3$, $V_2O_3$, $La_2O_3$, or $Ce_2O_3$, and wherein $XO_4$ represents $PO_4$, $MoO_4$, $VO_4$, $TlO_4$, or $SiO_4$. The value of $a$ is equal to $3.0 \pm 0.5 - b$; $b$ has a value of from zero to 1.5; $c$ has a value equal to $4.5 \pm 0.5 - d$; $d$ has a value of from zero to 2.0; $e$ has a value not exceeding 8. The atoms of said crystalline phase are arranged in a unit cell in such a manner that a typical x-ray powder diffraction pattern is essentially that of Table I below.

TABLE I

| d-A | Relative Intensity |
|---|---|
| 5.98 – 5.83 | medium |
| 5.10 – 4.90 | very strong |
| 3.59 – 3.49 | strong |
| 3.07 – 2.98 | very strong |
| 3.00 – 2.83 | strong |
| 2.35 – 2.25 | strong |
| 1.98 – 1.95 | medium |
| 1.95 – 1.90 | strong |
| 1.79 – 1.75 | strong |

The d-spacings and relative intensity values set forth in Table II below show the similarities existing in the X-ray diffraction patterns of three different alunite-type compositions as well as differences which can be used to distinguish among particular species if desired.

TABLE II

| Mineral Alunite* | | Synthetic K-Phase | | Synthetic $NH_4$-Phase | |
|---|---|---|---|---|---|
| d-A | I/I max | d-A | I/I max | d-A | I/I max |
| 5.77 | 30 | — | — | 5.98 | 10 |
| 5.72 | 14 | 5.75 | 10 | 5.74 | 5 |
| 4.96 | 55 | 4.98 | 40 | 5.04 | 100 |
| 3.49 | 20 | 3.51 | 25 | 3.51 | 20 |
| — | — | — | — | 3.08 | 15 |
| 2.99 | 100 | 3.00 | 100 | 3.03 | 95 |
| 2.89 | 100 | 2.88 | 5 | 3.00 | 50 |
| 2.48 | 6 | 2.48 | 2 | 2.51 | 2 |
| 2.29 | 80 | 2.29 | 20 | 2.35 | 25 |
| 2.21 | 6 | 2.22 | 5 | 2.22 | 2 |
| 2.04 | 2 | 2.03 | 2 | — | — |
| 2.02 | 2 | — | — | 1.98 | 10 |
| 1.93 | 70 | 1.91 | 25 | 1.91 | 30 |
| 1.90 | 30 | — | — | — | — |
| 1.76 | 2 | — | — | — | — |
| 1.75 | 16 | 1.75 | 20 | 1.75 | 20 |
| 1.68 | 2 | — | — | — | — |
| 1.67 | 2 | — | — | — | — |
| 1.65 | 2 | 1.65 | 2 | 1.66 | 5 |

*R. L. Parker, American Mineralogist, 47 (1962), 127.

The composition and structure of the novel catalysts of this invention are determined in party by the composition and structure of its precursor and in part by the temperature of calcination, both of which are readily controllable. Composition of the precursor is easily controllable in that it allows for myriad crystalline chemical substitutions or incorporations during hydrothermal synthesis. Precursor materials containing $Cr^{+3}$, $Fe^{+3}$, $La^{+3}$, and possibly $V^{+3}$ substituted for part of the Al, and $[CrO_4]$, $[PO_4]$, $[VO_4]$, $[TiO_4]$ and $[MoO_4]$, for part of the $SO_4$, have been prepared. Although structural substitution has not been established with certainty, crystalline compositions containing $Co^{+2}$, $Ni^{+2}$, $Cu^{+2}$, $Si^{+2}$, $F^-$, $U^{+4}$, $W^{+6}$ and $Zn^{+2}$ included within the structure to the extent of from about 0.1 wt.-% to about 15 wt.-% have been prepared. Metal-containing forms of these catalysts such as the noble metals, nickel, and other catalytically active metals also have been prepared and are more fully described in the subsequent examples. In general, catalysts containing from about 0.5 wt.-% to about 2.0 wt.-% of a fine dispersion of at least one noble metal may be prepared, as well as those containing a fine dispersion of Ni ranging from about 5 wt.-% to about 51 wt.-%.

Subsequent to hydrothermal synthesis of the precursor it is dried. To take full advantage of the precursor as a catalyst, it is calcined under controlled conditions. Calcination temperature is very important in that porosity and other catalytically significant properties are dependent on it. The broad range of calcination temperature employed according to the method of the invention is from 550° to 900°C. Several specific types of catalysts, all derived from the crystalline precursors herein described, are obtained depending on the particular temperature or temperature range of calcination.

Upon calcination at temperatures within the range of 550°C to about 800°C, preferably from about 700°C to about 800°C, aluminosulfate compositions having a range of sulfate content are formed from the crystalline precursor. The calcination products for convenience are denominated ASC.

This preferred range of calcination temperature, namely, 700°–800°C. produces, in general, an ASC having an adsorption pore size greater than 10A, a B-E-T $N_2$ surface area of greater than 50 $M^2$/g, and an adsorptive capacity for neopentane at 25°C, 500 torr, of greater than 2.5 wt.-%. Such ASC has a specific molar composition of $SO_4/Al_2O_3$ of from about 0.2 to about 0.9; is nonstoichiometric, amorphous to x-rays and has some residual short range order. These ASC materials which are derived from precursors containing $M_2O_3$ and/or $XO_4$ substituents are identified by having as a prefix the symbol for the substituent, e.g., "Cr-ASC" for a product of a precursor having $Cr_2O_3$ substituted for some of its $Al_2O_3$ content. The inclusion of noble metals into or onto ASC by metal loading or otherwise is possible, but such introduction is dissimilar to that of crystochemical substitution, etc. as described above, and shall be distinguished, therefore, by using a colon rather than a hyphen, e.g., "Pd; Cr-ASC" or "Pd: ASC."

Calcination of the several crystalline precursors at temperatures within the range of 550° to 900°C is readily carried out in air using conventional techniques and apparatus. Nitrogen and inert gas atmospheres are also suitable. Depending on the temperature, the calcination, among other things, decomposes ammonium cations if such are present, causes a stepwise reduction in sulfate content, forms oxide compositions, and creates a porosity and catalytic activity essential to the product. Although the length of the calcination period is not critical, a period of from about 2 to about 4 hours is found to be entirely suitable.

The figure included herewith graphically exhibits the importance of choosing a calcination temperature within the range prescribed below. It can be seen that no significant catalytic activity for the benzene-propylene alkylation reaction exists outside the approximate calcination temperature range of 550°C to 800°C as is exemplified by the $C_6H_6$ conversion curve for the Cr-ASC tested. Also, the effects of calcination temperature on sulfate content and on stepwise sulfate decomposition as is indicated by the DTA graph are clearly exhibited. This stepwise decomposition is typical of catalytically active compositions of this invention and is not observed in the K, Na, $NH_4$-Na, or $NH_4$-K phases structurally related to alunite.

Table III gives a summary of the characteristics of typical activated ASC and Cr-ASC catalysts as a function of calcination temperature. These characteristics include chemical composition, surface area, pore structure, and alkylation activity. In particular, Cr-ASC has a B-E-T $N_2$ surface area greater than 50 $M^2$/g, and an adsorption capacity for neopentane at 25°C, 500 torr, of greater than 2.5 wt.-%. It can be generally stated that the compositions of the various amorphous, nonstoichiometric ASC materials of this invention in terms of oxide molar ration range are $JO_4/Q_2O_3$=0.2–1.4, wherein $JO_4$ represent at least one oxide of a group consisting of $SO_4$, $PO_4$, $MoO_4$, $VO_4$, $TlO_4$ and $SiO_4$ and wherein $Q_2O_3$ represenets at least one oxide selected from a group consisting of $Al_2O_3$, $Cr_2O_3$, $Fe_2O_3$, $V_2O_3$, $La_2O_3$ and $Ce_2O_3$ as is demonstrated in Table III.

It follows from the foregoing disclosure that ASC compositions having specific chemical and physical properties may be developed by proportioning the reagents and substituents used in synthesizing the precursor material, by choosing an appropriate temperature at which to calcine such precursor, and by optionally introducing active metals into the calcined precursor. A detailed disclosure of these preparative variations will follow in subsequent examples.

terized by low residual sulfate constituent as a result of these higher calcination temperatures. The resulting AAB oxide compositions have B-E-T $N_2$ surface areas up to about 200 m²/gram depending on calcination temperature and chemical composition, generally exhibit a low degree of X-ray crystallinity, and retain some short range order, with some oxide compositions processing more crystallinity than others.

These AAB oxide products of the invention derived from the crystalline precursors hereinabove have compositions expressed in terms of oxide mole-ratios as $$JO_4/Q_2O_3 \quad 0.01 \quad 0.5,$$

wherein $JO_4$ represents $SO_4$ alone or in combination

TABLE III

PART A — ASC CATALYST

| Material | Catalyst Activation, Calcination Temperature °C., 2 hrs. in air | Chemical Analysis wt. % Anhydrous Basis | | Mole Ratio $SO_4/Al_2O_3$ | X-Ray Analysis | Catalyst B.E.T. $N_2$ Surface Area m²/g | Neopentane Adsorption (Large Pore Development) wt. % Adsorbed | Benzene-Propylene Alkylation Mole % Conversion[1] |
|---|---|---|---|---|---|---|---|---|
| | | $Al_2O_3$ | $SO_4$ | | | | | |
| Synthetic $NH_4$-ASC-Precursor | — | 37.4[2] | 55.7[2] | 1.57 | Crystalline pattern as in Table I | n.d.[3] | 0 | 0 |
| ASC | 550 | 44.5 | 55.5 | 1.33 | Amorphous | 12 | 0.2 | 0 |
| | 600 | 44.5 | 55.5 | 1.33 | ↓ | n.d. | n.d. | |
| | 650 | 49.0 | 51.0 | 1.10 | | n.d. | n.d. | <1.0 |
| | 700 | 55.0 | 45.0 | 0.87 | ↓ | 44 | n.d. | 19.2 |
| | 725 | 59.5 | 40.5 | 0.72 | Amorphous + trace $Al_2(SO_4)_3$ | 54 | 2.8 | 38.9 |
| | 750 | 63.3 | 36.7 | 0.62 | | 71 | 3.3 | 50.3 |
| | 775 | 63.8 | 36.1 | 0.60 | ↓ | 80 | 3.8 | 46.2 |
| | 800 | 75.2 | 24.8 | 0.35 | | 125 | 5.9 | 43.1 |
| | 850 | 86.8 | 13.1 | 0.16 | Amorphous + trace $\gamma$-$Al_2O_3$ | 135 | 6.0 | 8.7 |
| | 900 | 97.5 | 2.5 | 0.03 | Poorly crystalline $\gamma$-$Al_2O_3$ | 123 | 5.3 | 0 |

[1]Standard alkylation test: 10 g of activated catalyst in 1 g-mole $C_6H_6$ treated with excess propylene at ambient temperature and pressure for one hour.
[2]In addition contains $(NH_4)_2O$ and $H_2O$
[3]n.d. = not determined

TABLE III

PART B — Cr-ASC CATALYST

| Material | Catalyst Activation, Calcination Temperature °C., 2 hrs. in air | Chemical Analysis wt. % Anhydrous Basis | | | Mole Ratio[1] $SO_4/D_2O_3$ | X-Ray Analysis | Catalyst B.E.T. $N_2$ Surface Area m²/g | Neopentane Adsorption (Large Pore Development) wt. % Adsorbed | Benzene-Propylene Alkylation mole % Conversion |
|---|---|---|---|---|---|---|---|---|---|
| | | $Al_2O_3$ | $Cr_2O_3$ | $SO_4$ | | | | | |
| $NH_4$-Cr-Precursor | — | 27.8[3] | 11.9[3] | 53.4[3] | 1.62 | Crystalline pattern as in Table I | n.d.[4] | 0 | 0 |
| Cr-ASC | 550 | 30.7 | 12.9 | 56.4 | 1.52 | Amorphous | n.d. | 0.5 | 3.1 |
| | 575 | 33.9 | 12.9 | 53.2 | 1.33 | Amorphous | 50 | n.d. | 43.6 |
| | 600 | 34.5 | 14.6 | 50.9 | 1.22 | Amorphous + | n.d. | 0.5 | 43.3 |
| | 625 | 37.0 | 15.3 | 47.7 | 1.07 | trace poorly | 101 | n.d. | 42.5 |
| | 650 | 44.3 | 18.2 | 37.4 | 0.70 | crystalline | n.d. | n.d. | 46.9 |
| | 675 | 48.7 | 20.4 | 30.8 | 0.53 | $Cr_2O_3$ | 218 | n.d. | 50.5 |
| | 700 | 57.9 | 24.1 | 18.0 | 0.26 | Amorphous + poorly | n.d. | 4.8 | 39.4 |
| | 725 | 61.9 | 24.4 | 13.7 | 0.21 | crystalline | 202 | n.d. | 46.7 |
| | 750 | 61.2 | 25.4 | 13.4 | 0.18 | $Cr_2O_3$ | n.d. | 4.2 | 19.7 |
| | 800 | 64.6 | 27.0 | 8.3 | 0.11 | | 167 | 6.6 | 1.0 |

[1]$D_2O_3 = Al_2O_3 + Cr_2O_3$
[2]Standard alkylation test: 10 g. of activated catalyst in 1 g-mole $C_6H_6$ treated with excess propylene at ambient temperature and pressure for one hour.
[3]In addition contains $(NH_4)_2O$ and $H_2O$
[4]n.d. = not determined Upon calcination of the above-described crystalline precursors at temperatures within the range about 800° to about 900°C for a period greater than 2 hours, another type of catalyst is obtained according to the method of the invention. The calcination products for convenience are denominated "AAB" and are characwith one or more oxides of a group consisting of $PO_4$, $MoO_4$, $VO_4$, $TlO_4$, and $SiO_4$; with the proviso that the $SO_4/Q_2O_3$ oxide mole-ratio does not exceed about 0.2; and wherein $Q_2O_3$ represents $Al_2O_3$ alone or in combination with one or more oxides of a group consisting of $Cr_2O_3$; $Fe_2O_3$, $V_2O_3$, $La_2O_3$ and $Ce_2O_3$. Preferably the ratio $SO_4/Q_2O_3$ is not less than 0.01.

Exemplary of the AAB catalyst compositions are those having oxide compositions expressed in terms of molar ratios as follows:

$SO_4/Al_2O_3 = 0.01$ to 0.2;
$SO_4/(Al_2O_3 + Cr_2O_3) = 0.01$ to 0.2, such compositions having a B-E-T surface area greater than 100 m²/g; and $SO_4/(Al_2O_3 + Fe_2O_3) = 0.01$ to 0.2, such compositions having a B-E-T surface area greater than 40 m²/g.

Especially preferred because they exhibit a high degree of activity for n-paraffin dehydrogenation processes are the AAB materials having, as above, compositions expressed in terms of oxide mole-ratios as $SO_4/Al_2O_3 = 0.01 \rightarrow 0.2$ and containing from 0.05 to 2.0 wt-% of a fine dispersion of at least one metal selected from a group consisting of the noble metals, such as Pd and Pt. Catalytically active materials such as $K_2O$, Pt, Pd, etc. may be introduced into the oxide composition variously by anion, cation or amine complex ion-exchange or by impregnation, whichever is suitable. Another preferred AAB composition for such dehydrogenation process is $SO_4/Al_2O_3 + Fe_2O_3) = 0.01 \rightarrow 0.2$, where the $Fe_2O_3$ content is from about 20 to about 60 wt.-% on an anhydrous basis, which composition is highly effective in this dehydrogenation reaction without requiring the presence of the expensive noble metal.

The chemical make-up and structure of the AAB oxide compositions of this invention are determined in part by precursor composition and in part by calcination temperature, both of which are readily controllable. Also, the extent of catalytic activity in some reactions of the oxide composition is dependent upon the degree of porosity developed in these compositions which in turn is a function of calcination temperature. The high surface area can be a factor contributing to the high efficiency of these AAB oxide compositions per unit weight in some catalytic reactions.

It follows that AAB compositions having specific chemical and physical properties may be developed by proportioning the reagents used in synthesizing the precursor, by choosing an appropriate temperature at which to calcine such synthetic precursor, and by optionally ion exchanging and/or loading these compositions with active materials. Again, detailed preparative variations will be disclosed in the subsequent examples.

In general, then, the compositions of the various amorphous, nonstoichiometric ASC and AAB materials obtained according to the invention over the calcination temperature range of 550°C to 900°C are, in terms of oxide molar ratios, $JO_4/Q_2O_3 = 0.01-1.4$, wherein $JO_4$ and $Q_2O_3$ are as defined above.

It has been found that calcination of mineral alunite or its synthetic analogue yields compositions having no catalytic activity, for example, in hydrocarbon alkylation. The present invention, in comparison, discloses an ammonium form of a synthetic crystalline precursor structurally related to alunite which demonstrates considerable catalytic activity in hydrocarbon conversion reactions because its precursor, unlike natural or synthetic alunites, contains essentially no sodium or potassium, the presence of which is detrimental to catalysis. What is more, the presence of $NH_4$ in place of K or Na is catalytically beneficial per se. Also, the fact that the ASC has no significant cation exchange capacity for Na or K insures that "poisoning" by ion exchange of sodium or potassium will not occur should these ions be present during catalysis.

Co-catalysts may be employed with the ASC and AAB catalyst materials for desired purposes, e.g., to enhance activity and/or the selectivity for a particular process, to facilitate catalyst regeneration as in oxidative removal of reaction residues, or to contribute specific catalytic activity not already present in the catalyst materials of the invention. ASC and AAB materials may be regenerated by heating to at least 550°C in a purge of air or other suitable gas. Co-catalysts include, but are not limited to, catalytically active metals or compounds of metals of Groups IB, IIB, IIIB, IVB, VIB, VIIB, VIII and the Lanthanide and Actinide series of the rare earths as listed in the Periodic Table as found on page 3 of the Handbook of *Chemistry and Physics*, 46th Edition, published by the Chemical Rubber Company. Catalytically active compounds include oxides, nitrides, sulfides, halides and oxyhalides of the catalytic metals.

The co-catalysts are added to or incorporated into the ASC and AAB materials prior to, during or after agglomeration thereof, if agglomeration is performed. One preferred method for incorporating the co-catalyst in low concentration is by ion exchange employing in aqueous solution one or more of the metals of Groups IB, IIB, IVB, VIB, and VIII having soluble cations containing the metal. This is preferably done after the formation of the new crystalline phase and may be done after the thermal decomposition of the new phase. The metal of the metal containing cation is converted to its elemental state by heating above 200°C., preferably in a reducing atmosphere such as hydrogen. Sulfiding by treatment with hydrogen sulfide is sometimes desirable. Alternatively, or additionally, the co-catalysts may be added by impregnation techniques after the formation of the new crystalline phase. Organometallics such as the metal acetylacetonates dissolved in organic solvents may be employed in impregnation of ASC and AAB materials. Impregnation is preferably done with the powder or agglomerated catalyst in at least a partially dried state.

The active catalyst materials prepared in accordance with this invention may be combined, dispersed, or otherwise intimately admixed with a porous inert or cocatalyst binder in such proportions that the resulting agglomerate product contains from about 1 to 95% by weight, and preferably from about 2 to 80% by weight, of the final composite. The incorporation of ASC or AAB material into a binder may be accomplished either before, after, or during incorporation of a co-catalyst. Binders which may be employed include clays, refractory oxides and inorganic gels.

The inorganic oxide may be silica, alumina or a plural gel comprising a predominant amount of silica or alumina with one or more metals or oxides selected from Groups IB, II, III, IV, V, VI, VII, and VIII of the Periodic Table. Particular preference is given to plural gels of silica with metal oxides of Groups IIA, III and IVA of the Periodic Table, especially wherein the metal oxide is magnesia, rare earth oxide, alumina, zirconia, titania, beryllia, thoria, or combinations thereof. The preparation of silica, alumina and plural gel is well known and generally involves either separate precipitation or co-precipitation techniques in which a suitable salt of the metla oxide is added to an alkali metal silicate and an acid or base, as required, is added to precipitate the corresponding oxide.

The crystalline precursor-inorganic oxide gel composition can be prepared be several methods wherein the precursor is intimately admixed with an inorganic oxide gel while the latter is in hydrous state as in the form of a hydrosol, hydrogel, wet gelatinous precipitate or a mixture thereof. The mixing of the two components can be accomplished in any desired manner such as in a ball mill or other type of kneading mill.

The binder may also consist of a semi-plastic or plastic clay mineral. The crystalline precursor can be incorporated into the clay simply by blending the two and fashioning the mixture into desired shapes. Suitable clays include attapulgite, kaolin, sepiolite, palgorskite, kaolinite, plastic ball clays, bentonite, montmorillonite, illite, chlorite, etc.

Minor amounts of promoters or other materials which may be present in the overall catalyst composition include cerium, chromium, cobalt, tungsten, uranium, platinum, lead, zinc, calcium, magnesium, barrium, lithium, and nickel.

Catalysts of this invention may be used in a powdered granular or molded state formed into spheres or pellets of finely divided particles having a particle size of 2 to 500 mesh. In cases where the catalyst is molded, such as by extrusion, the crystalline precursor may be extruded before drying, or dried or partially dried and then extruded. Generally, the ASC or AAB precursor is dried between 75°C. and 300°C. before being calcined.

Catalysts prepared in accordance with this invention find extensive utility in a wide variety of hydrocarbon conversion processes including isomerization of paraffins, olefins and aromatic compounds, dealkylation, alkylation of isoparaffins and aromatics, disproportionation, hydration of olefins, amination of olefins, hydrocarbon oxidation, dehydrogenation, dehydration of alcohols, desulfurization, hydrogenation, hydroforming, reforming, hydrocracking, oxidation, polymerization, cracking, denitrification and the like.

The processes of this invention may be carried out in any equipment suitable for catalytic operations and may be practiced on a batchwise basis. It is preferable, however, and generally more advantageous to operate continuously. Accordingly, these processes may be practiced using a fixed catalyst bed. Also, these processes may be operated using a moving catalyst bed wherein the hydrocarbon flow is concurrent or countercurrent to the catalyst flow. A fluid type of operation wherein the catalyst is carried in suspension in the hydrocarbon charge is well adapted for use with the catalysts of this invention.

In addition to catalyst, the present invention discloses processes for the catalytic conversion of hydrocarbons.

The hydrocracking process of this invention comprises passing the petroleum feed stock in admixture with hydrogen over the catalyst at a suitable temperature, feed rate, and pressure to effect a substantial conversion of the feed stock to lower boiling materials such as gasoline.

The hydrocracking conditions employed herein generally involve passing the hydrocarbon feed with hydrogen over the catalyst at temperatures ranging from 150° to 485°C., pressures from 200 to 5,000 psig, and space velocities ranging from 0.5 to 5.0 volumes of feed per hour per volume of catalyst. The preferred hydrogen: hydrocarbon mole ratios can range from 10 to 50.

Feed stocks include straight-run gas oils boiling between about 205° and 425°C., cycle oils from conventional cracking operations boiling generally in the gas-oil range, heavy, petroleum fractions boiling from 480° to 760°C., heavy naphtha fractions and alkyl-aromatic hydrocarbons in general. The process is especially valuable for converting light and heavy gas oils to naphtha boiling in the gasoline range, and to premium quality fuel oils.

For the desulfurization of hydrocarbons, which involves largely hydrogenation, the metals, oxides and sulfides of such metals as cobalt, molybdenum, chromium, manganese, vanadium, tungsten, copper, metals of Group VIII of the Periodic Table and mixtures thereof may be used as co-catalysts with the ASC or AAB.

Desulfurization of gas oils boiling from 205° to 540°C., cycle oils, boiling in the gas-oil range, light and heavy naphtha fractions, highly aromatic fractions and the like, may be carried out at temperatures between about 315° and 540°C. under atmospheric or superatmospheric pressures with a space velocity (LHSV) between 0.2 and 50. Hydrogen-to-hydrocarbon ratios range from 100 to 30,000 cu. ft. per 42 U.S. gal. barrel. The specific conditions within these ranges will vary with the feed stock undergoing desulfurization and the product specification desired.

The dehyrogenation of hydrocarbons such as propane, butylene, butane, pentane, cyclopentane, cyclohexane, methyl cyclohexane, ethylbenzene and the like, can be carried out at temperatures ranging from about 425° to 760°C. under subatmospheric, atmorspheric or superatmospheric pressures with a space velocity (LHSV) from 0.2 to 50. For dehyrogenation, metals and oxides and sulfides of metals from Groups IB, IIB, VI and VIII of the Periodic Table, can be employed as co-catalyst with the ASC or AAB.

Reforming, in accordance with the present invention, is generally carried out at a temperature between about 370°C. and 540°C. and preferably between about 425°C. The pressure during reforming is within the range of about 100 to about 1,000 psig, and preferably between about 200 and about 700 psig. The liquid hourly space velocity employed, i.e., the liquid volume of hydrocarbon per hour per volume of catalyst is between about 0.1 and about 10 and preferably between about 0.5 and about 4. In general, the molar ratio of hydrogen to hydrocarbon charge employed is between about 1 and about 20 and preferably between about 4 and about 12.

Hydrocarbon charge stocks undergoing reforming in accordance with this invention comprise mixtures of hydrocarbons and particularly, reformer hydrocarbon charge stocks such as petroleum distillates boiling within the approximate range of 65° to 260°C. which range includes naphthas, gasolines and kerosene. It is, however, preferred to use a selected fraction, such as naphtha having an initial boiling point of between about 65°C. and about 120°C.

Catalysts of the invention can be employed in the hydrogenation of unsaturated aliphatic hydrocarbons, such as mono-olefins, diolefins, etc., to form the corresponding saturated hydrocarbons, hydrogenation of unsaturated cyclic hydrocarbons, and hydrogenation of unsaturated alcohols, ketones, acids, etc. For hydrogenation reactions, the temperature may range up to 540°C. under a pressure of about 10 to 3,000 pounds, psi or more, at a space velocity (LHSV) from about 0.5 to 5.0. The co-catalysts which are normally employed with the ASC or AAB include the metals, oxides and sulfides of metals of Groups IB, IIB, VI, and VIII of the Periodic Table.

Catalysts of the invention may be utilized for the alkylation of aromatic hydrocarbons or phenols with olefinic unsaturated hydrocarbons, alkyl halides and alkyl sulfates. Alkylation of aromatics and phenols may be carried out at temperatures between 0°C. and 450°C. under pressure of 0 to 1,000 psig.

The catalysts of the present invention are extremely active and may be used for the isomerization of a wide variety of feed stocks. Thus, low boiling paraffin hydrocarbons which contain at least four carbon atoms, especially 4 to 10 carbon atoms, or olefins of the same carbon number range, such as, for example, normal butene, normal pentene, 2-methyl-1-pentene and 2-methyl-2-pentene, may be used.

The conditions under which hydrocarbons are isomerized in accordance with the invention include a temperature ranging from 10°C. to about 450°C. and preferably between about 120°C. and 400°C. The liquid hourly space velocity (LHSV) is between about 0.05 and 40 and preferably between about 0.25 and 10. The molar ratio of hydrogen to hydrocarbon is between 0.1 and 20 and is preferably between 0.5 and 5. The reaction may be effected under liquid or vapor phase conditions at subatmospheric, atmospheric or superatmospheric pressure. The pressure will be between about 5 to 7,500 psia, and is preferably between about 100 and 700 psia.

The catalysts are also suitably employed in the isomerization of polyalkyl-substituted aromatic compounds such as xylene, di-ethylbenzene, di-isopropybenzene, dimethylnaphthalene and the like. Feed to the process of the invention as an example, can be a substantially pure xylene isomer, a mixture of xylene isomers or hydrocarbon fractions rich in xylene isomers. The process of the invention is carried out at a temperature in the range of from about 205°C. to 510°C. and preferably from about 280° to 430°C.

The isomerization reaction can be conducted at a space velocity (WHSV) in the range from about 0.5 to 25, preferably in the range from about 1 to 10.

The presence of hydrogen functions to improve catalyst life, and apparently also, functions to improve conversion and selectivity for the isomerization reaction. A hydrogen-to-hydrocarbon mole ratio of from about 1:1 to 25:1 and preferably from about 5:1 to 15:1 is used. Total pressure is in the range from about 100 to 1,500 psig, and preferably from about 500 to 1,000 psig.

ASC and AAB catalyze the disproportionation of alkylaromatics such as toluene. Feed for the process of the invention can be substantially pure alkylaromatic having from 7 to 15 carbon atoms, mixtures of such alkylaromatics and includes mono and di-aromatics such as alkylbenzenes and alkylnaphthalenes. The alkylaromatic is converted to higher alkylaromatics and to lower alkylaromatics, including benzene or naphthalene.

This process is conducted at a temperature in the range from about 200° to 600°C. and preferably from about 300° to 450°C. In general, disproportionation is increased as temperature is increased.

A hydrogen-to-oil mole ratio from about 1:1 to about 50:1 is used. Total pressure is in the range from about 100 to 2,000 psig. The disproportionation reaction is effected at a space velocity (WHSV) in the range from about 0.1 to about 25.

The catalyst of this invention is useful for the production of polymer gasoline, petrochemical intermediates and high molecular wt. oils and resins. These products are obtained from feed stocks rich in $C_2$ to $C_8$ olefins which are contacted with the catalyst at temperatures ranging from 0° to 300°C. at pressures of 1 to 1,000 atmospheres, preferably 1 to 200 atmospheres. Non-distillable high boiling and resinous products are removable from the catalyst by solvent extraction but may, if desired, retain the catalyst.

Catalytic cracking utilizing the catalysts of this invention alone or with conventional cracking catalyst material, for example silica-alumina, is conducted in a fluid-bed, or a fixed-bed with moving catalyst particle withdrawal for catalyst regeneration. The hydrocarbon feed is of the gas-oil-type boiling in the range of 205° to 540°C. The feed is preheated and contacted with the catalyst at temperatures ranging from 370° to 650°C. at a feed rate of 0.5 to 10 liquid volumes per volume of catalyst per hour. The conversion to gasoline fraction and lighter hydrocarbons is about 30 to 70 percent.

Isoparaffin alkylation for the production of high octane gasoline is conducted with the catalyst of this invention using feeds rich in $C_4$ to $C_6$ isoparaffins signly or mixed. The alkylating olefin is a $C_2$ to $C_6$ unsaturated hydrocarbon and may be one or a mixture thereof having straight or branched chain structure. Process conditions include liquid, liquid-vapor or vapor-phase operation in the temperature range of 20°C. to 300°C. The pressure is suitably maintained for the liquid and/or vapor phase operation as desired with preference for pressures conducive to the presence of at least partial liquefaction of one of the reactant or alkylate products within the catalyst contact zone. The mole ratio of feed olefin to isoparaffin is at most 1:4. A catalyst contacting rate for the olefin is 0.01 to 2 weight hourly basis.

Dealkylation and hydrodealkylation wherein a hydrogenation co-catalyst may be employed with the catalyst of this invention are processes similar respectively to cracking and hydrocracking of more specific feed materials than used in the latter processes. The process is directed primarily to the removal of $C_2$–$C_4$ alkyl groups pendant to aromatic molecules, for example, the removal of methyl or ethyl group from toluene, ethylbenzene or methyl- or ethylsubstituted naphthalenes. Temperatures useful for dealkylation range from 400° to 700°C., at 3 to 100 atmospheres pressure. Hydrogen is added at a mole ratio of 3 to 100 to the feed.

The following examples demonstrate the synthesis of various types of ASC and AAB and the catalytic efficacy of selected ASC and AAB materials prepared in accordance with this invention.

EXAMPLE I

In an example of the synthesis of $NH_4$-ASC-precursor and the preparation of ASC therefrom (cf. Table III), a series of gels was prepared by precipitation of $Al_2(SO_4)_3 \cdot 18H_2O$ solution by titrating with $NH_4OH$ to a pH of 7.5. The precipitate was filtered, washed with water and manually mixed with sulfuric acid and water to increase $SO_4$ concentrations and adjust the pH to about 2. The resultant gels were placed in teflon-lined jars and digested at 100° for 21 hours. The solid products were filtered, washed with water and dried at 110°C. The weights of reagents used in the above procedure were as follows: $Al_2(SO_4)_3 \cdot 18H_2O$, 30.0 grams; $H_2SO_4$(98%), 6.0 grams; $NH_4OH$(60%), 1.8 grams; $H_2O$, 75 grams. The molar composition of this reactant mixture was, in terms of the component oxides, $(NH_4)_2O \cdot 3Al_2O_3 \cdot 4SO_3$ greater than $280H_2O$.

Four separate preparations were made according to the foregoing procedure. The four products were combined into one lot and X-ray analysis of a sample of this lot indicated that the crystalline product had a typical X-ray powder diffraction pattern as disclosed in Table I. Chemical analysis gave the following mole oxide composition: $(NH_4)_2O \cdot 3.1Al_2O_3 \cdot 4.6SO_4 \cdot 5.6H_2O$.

A portion of the above material was calcined in air at 700°C. for 2 hours. X-ray diffraction analysis of a sample of the calcined material showed that it was amorphous. Chemical analysis showed the following composition: $(NH_4)_2O$ = less than 0.1 weight per cent, $Al_2O_3$ = 54.5 weight per cent, $SO_4$ = 44.6 weight per cent with the molar ratio $SO_4/Al_2O_3$ being 0.8. The surface area by the B-E-T $N_2$ method was measured as 44 $M^2/g$.

EXAMPLE 2

In another example of this invention, ASC was prepared and tested in benzene alkylation catalysis. Eight gels were prepared and crystalized by the same procedure as described in Example 1. The weights of reagents used in each batch were as follows: $Al_2(SO_4)_3 \cdot 18 H_2O$, 40.0 grams; $H_2SO_4(98\%)$, 8.0 grams; $NH_4OH(60\%)$, 2.4 grams; $H_2O$, 100 grams. The molar composition of this reactant mixture was, in terms of component oxides, $(NH4)_2O \cdot 3Al_2O_3 \cdot 4SO_3 \cdot$ greater than 280 $H_2O$.

The eight products were combined in one lot and X-ray analysis of a sample of this lot indicated that the crystalline product had an X-ray powder diffraction pattern having at least those lines contained in Table I. Chemical analysis gave the following molar oxide composition: $(NH_4)_2O \cdot 3.1 Al_2O_3 \cdot 4.5SO_4 \cdot 5.2H_2O$. A portion of the above materials was calcined in air at 800°C. for 2 hours. X-ray diffraction examination of a sample of the calcined material showed that except for a trace of $Al_2(SO_4)3$ impurity, it was amorphous. Chemical analysis showed the following composition: $Al_2O_3$=65.3 weight per cent, $SO_4$= 21.0 weight per cent with the molar ratio $SO_4/Al_2O_3$ being 0.35. The surface area by the B-E-T- $N_2$ method was measured at 125 meters² per gram.

When tested as a catalyst in the alkylation of benzene with propylene this sample achieved a 43.1 mole per cent conversion of benzene in 1 hour. In the alkylation reaction a 10-gram charge of activated ASC-type catalyst was charged to one gram-mol of benzene in a three-necked flask fitted with a condenser and thermometer, and was magnetically stirred. Excess propylene was bubbled through the slurry at room temperature. Pot samples were taken at intervals during the reaction and analyzed by gas chromatography. A similar procedure was used for batchwise alkylation of cumene. Neopentane adsorption was 5.9 weight per cent at 25°C. and 750 millimeters of mercury.

EXAMPLE 3

In an example which indicates the effect of calcination temperature, a sample was prepared as described in Example 2. A portion of the resulting ASC precursor was calcined in air for 2 hours at 750°C. (50°C. less than in Example 2). X-ray diffraction analysis of the calcined material showed that except for a trace of $Al_2(SO_4)_3$ it was amorphous. Chemical analysis showed the following composition: $Al_2O_3$ = 63.4 weight per cent, $SO_4$= 37.0 weight per cent, with the molar ratio $SO_4/Al_2O_3$ being 0.62. The surface area by the B-E-T $N_2$ method was measured as 71 meters² per gram.

In the alkylation of benzene with propylene this sample produced a 50.3 mole per cent conversion of benzene compared with 43.1 mole per cent in Example 2. Neopentane adsorption was 3.3 weight per cent.

EXAMPLE 4

In an example of this invention which demonstrates the preparation of a Cr-containing ASC, 798 grams of $Al_2(SO_4)_3 \cdot 18 H_2O$ and 333 grams of $Cr_2(SO_4)3 \cdot 5H_2O$ were dissolved in 1500 cc of water. To this was added 360 grams of $NH_4OH(60\%)$. The overall molar composition of the resulting mixture was in terms of component oxides: 5.0 $(NH_4)_2O \cdot 2.0$ $Al_2O_3 \cdot 1.0$ $Cr_2O_3 \cdot 9.0$ $SO_3$. approximately 160 $H_2O$. This slurry was digested at 100°C. under reflux conditions for 21 hours. The solids were separated from the liquor by filtration, washed with water and dried at 110°C. X-ray analysis of a sample indicated that the crystalline product had an X-ray powder diffraction pattern having at least those lines contained in Table I. Chemical analysis gave the following molar oxide composition: 1.0 $(NH_4)_2O \cdot 2.4$ $Al_2O_3 \cdot 0.66$ $Cr_2O_3 \cdot 4.9SO_4 \cdot 7.5$ $H_2O$. A portion of the above material was calcined in air at 650°C. for 2 hours. X-ray diffraction analysis showed the sample to be essentially amorphous with no evidence of the crystalline precursor phase. Chemical analysis showed the following composition: $Al_2O_3$ = 34.4 weight per cent, $Cr_2O_3$ = 14.1 weight per cent, $SO_4$= 29.0 weight per cent, the molar ratio $SO_4/M_2O_3$ being 0.70 where $M_2O_3$ is equal to $Al_2O_3 + Cr_2O_3$.

In the alkylation of benzene with propylene after 1 hour this catalyst produced a 46.9 mole per cent benzene conversion.

EXAMPLE 5

In an example demonstrating the preparation of a vanadium-containing ASC the procedure of Example 4 was followed using the same quantities of $Al_2(SO_4)_3 \cdot 18$-$H_2O$, $NH_4OH$ and water, and 120 grams of $VOSO_4 \cdot 2$-$H_2O$. The overall composition of the resulting mixture was in terms of moles of component oxides: 5.0 $(NH_4)_2O \cdot 2.0$ $Al_2O_3 \cdot 1.0$ $V_2O_5 \cdot 8.0$ $SO_3$ approximately 150 $H_2O$.

X-ray analysis of a sample indicated that the crystalline product had an X-ray powder diffraction pattern having at least those lines contained in Table I. Chemical analysis gave the following molar oxide composition: 1.0 $(NH_4)_2O \cdot 2.6$ $Al_2O_3 \cdot 0.88$ $V_2O_5 \cdot 4.4SO_4 \cdot 4.8H_2O$. A portion of the above material was calcined in air at 650°C. for 2 hours. X-ray diffraction analysis of a sample of calcined material showed it to be amorphous except for a trace of $Al_2(SO_4)_3$. Chemical analysis showed the following composition: $Al_2O_3$ = 49.9 weight per cent, $V_2O_5$ = 14.8 weight per cent, $SO_4$ = 44.4 weight per cent, the molar ratio $TO_4/Al_2O_3$ being 1.36 where $TO_4 = SO_4 + VO_4$.

EXAMPLE 6

In another example of this invention wherein a noble metal-containing ASC is prepared, 560 grams of ASC-precursor was prepared by dissolving 1,200 grams of $Al_2(SO_4) \cdot 18H_2O$ in 1500 cc of $H_2O$ and adding 360 grams of $NH_4OH$ (60%) and refluxing for 21 hours. It had a chemical composition in terms of moles of component oxides of $(NH_4)_2O \cdot 2.8Al_2O_3 \cdot 4.5SO_4 \cdot 6.3H_2O$, and had an X-ray powder diffraction pattern having at least those lines shown in Table I. It was calcined at 750°C. for 2 hours in air and the yield of activated catalyst material was 308 grams. Chemical analysis gave the following composition: $Al_2O_3$ = 54.7 weight per cent, $SO_4$ = 45.2 weight per cent, the molar ratio $SO_4/Al_2O_3$ being 0.88.

Two 145-gram portions of the calcined material were each added to separate quantities (8.0 grams) of $Pd(NH_3)_4Cl_2$ dissolved in 600 cc of water. These slurries were stirred for 1.5 hours at room temperature and filtered. Filter cake from the first sample was washed with water and dried at 110°C. Filter cake from the second sample was washed with water and acetone, then dried under vacuum at room temperature. Both solid products were calcined at 550°C. in air for 2 hours. Chemical analyses of these samples gave the following results: In both samples PD = 1.8 weight per cent, and for the first and second samples respectively Cl = 0.4 and 0.02 weight per cent.

EXAMPLE 7

In another example of this invention wherein noble metal is introduced into an ASC, 1 pound of $NH_4$-ASC-precursor was partly decomposed by calcination at 350°C. for 2 hours in air. This material was then divided into 2 portions. One portion was impregnated with $H_2PtCl_6$ solution by blending as a thick paste. This was dried at 110°C. and calcined at 750°C. for 2 hours in air. The second portion was slurried in $H_2PtCl_6$ solution (2,000 cc), stirred for one hour, filtered and washed with acetone. This second sample was dried at 110°C. and calcined at 750°C. for 2 hours in air.

A 5 gram portion of the first sample, after reactivation at 550°C. for 2 hours in air, was added to 20 milliliters of benzene in a 50 cc high-pressure vessel and pressurized with $H_2$ to 200 psig at ambient temperature. The vessel was then heated to 250°C. and maintained at that temperature with agitation for 14 hours. The pressure rose to a maximum of 300 psig; on cooling to ambient temperature, the pressure was 0, showing essentially quantitative reaction of hydrogen. The cycle was repeated by pressurizing to 600 psig with $H_2$ at ambient temperature and heating to 250°C. with rocking (agitation). At 190°C. the pressure reached a maximum of 800 psig and then decreased as the hydrogenation reaction began and leveled at 250 to 300 psig at 250°C. The vessel was repressurized to 750–800 psig of $H_2$ 5 times at 250°C., then to 1,000–1,050 psig of $H_2$ 6 times until a constant pressure of approximately 1,000 psig was observed. The total reaction time at 250°C. was 13 hours. The vessel was cooled to ambient temperature where the residual pressure was 300 psig. Gas chromatographic analysis of the liquid product showed only a trace of benzene, 75 mole-per cent cyclohexane, 6 mole-per cent methylcyclopentane and 18.2 mole-per cent of other hydrogenated products (cyclohexyl-cyclohexane, phenylcyclohexane and an unidentified component.)

EXAMPLE 8

In another example of this invention wherein a pure $NH_4$-ASC-precursor was prepared, 1800 grams of $Al_2(SO_4)_3 \cdot 18H_2O$ were dissolved in 2250 cc of water. To this was added 540 grams of $NH_4OH(60\%)$. The overall molar composition of the resulting mixture was in terms of the component oxides: 5.0 $(NH_4)_2O \cdot 3.0$ $Al_2O_3 \cdot 9.0$ $SO_3$ approximately 160 $H_2O$. This slurry was digested at 100°C. under reflux conditions for 21 hours. The solids were separated from the liquor by filtration, washed with water and dried at 110°C. X-ray analysis of a portion of this sample showed that the crystalline product had an X-ray powder diffraction pattern having at least those lines contained in Table I. Chemical analysis gave the following molar oxide composition: $(NH_4)_2O \cdot 2.77$ $Al_2O_3 \cdot 4.58$ $SO_4 \cdot 6.1$ $H_2O$. In preparing a catalyst from the above described $NH_4$-ASC-precursor a 10-gram portion of said material was calcined in air at 750°C. for 2 hours. X-ray diffraction analysis of a sample of the calcined material showed it to be amorphous with no crystalline precursor remaining.

In the alkylation of cumene with propylene after 1 hour this catalyst produced a 60.6 mole-per cent conversion of cumene to diisopropylbenzene (37.3 mole-per cent), triisopropylbenzene (17.3 mole-per cent), and other higher alkylated products (6.0 mole-per cent).

EXAMPLE 9

In another example of this invention wherein a palladium form of ASC is developed, a sample of the $NH_4$-ASC precursor prepared according to Example 8 was calcined at 400°C. in air for 2 hours. A 50-gram portion of this calcined material was added to a solution of 0.7 grams of palladium acetylacetonate in 50 milliliters of benzene and mixed therewith. The benzene was stripped off by applying a vacuum at room temperature. The resulting Pd-containing solid was calcined at 750°C. for 2 hours in air X-ray analysis of the final product showed that it was amorphous with a trace of $Al_2(SO_4)_3$. Chemical analysis of this Pd:ASC showed the presence of 0.81 weight-per cent palladium.

A 10-gram portion of the above prepared PD: ASC was tested in the alkylation of benzene with propylene. After 1 hour 36.8 mole-per cent benzene had been converted to alkylated product, thus demonstrating strong alkylation activity.

EXAMPLE 10

In an example of ethylene hydration, ASC having a composition of 51.6wt.-%$Al_2O_3$ and 42.4wt.-%$SO_4$ was contacted with a $C_2H_4$-$H_2O$ mixture having a molar ratio of $C_2H_4/H_2O$=1 and produced 0.34 lbs. of ethanol per ft.$^3$ of catalyst per hour at 1,000 psig. and 285°C.

A Cr-ASC by comparison having a composition of 15.7wt.-%$Cr_2O_3$, 40.4wt.-%$Al_2O_3$ and 43.9wt.-%$SO_4$ produced 0.13 lbs. of ethanol per ft.$^3$ of catalyst per hour at 1,000 psig and 285°C., using a $C_2H_4$-$H_2O$ mixture having a molar ratio of $C_2H_4/H_2O$ = 1.

EXAMPLE 11

In another example of this invention the dehydration of ethanol was achieved using an ASC having a composition of 57.7wt.-%$Al_2O_3$ and 42.3wt.-%$SO_4$. Dehydration of ethanol proceeded at a rate 12 times that of a commercial $H_3PO_4$-$SiO_2$ catalyst at 285°C. and atmospheric pressure.

A Cr-ASC having a composition of 15.1wt.-%$Cr_2O_3$, 40.7wt.-%$Al_2O_3$ and 44.7wt.-%$SO_4$ dehydrated ethanol at a rate 64 times that of a commercial $H_3PO_4$-$SiO_2$ catalyst at 285°C. and atmospheric pressure.

EXAMPLE 12

In an example of the oxidation of toluene, Cr-ASC having a composition of 15.7wt.-%$Cr_{23\ 2}O_3$,40.4 wt.-%$Al_2O_3$ and 43.9wt.-%$SO_4$ oxidized toluene to benzaldehyde, benzoic acid, CO and $CO_2$ with a toluene conversion of 8.3% at 475°C. and an air-toluene ratio of 3.45 : 1.

A V-ASC having a composition of 20.6wt.-%$V_2O_5$, 67.1wt.-%$Al_2O_3$ and 12.3wt.-%$SO_4$ on an anhydrous basis oxidized toluene to benzaldehyde, benzoic acid, CO and $CO_2$ with a toluene conversion of 9.6% at 475°C. and an air-toluene ratio od 3.45 : 1.

EXAMPLE 13

In an example of the cracking of cumene, an ASC having a composition of 56.3wt.-%$Al_2O_3$ and 43.7wt.-%$SO_4$ produced a 52.9% conversion of cumene to benzene and propylene at 400°C. and atmospheric pressure.

EXAMPLE 14

In an example of the isomerization of cyclohexane and n-hexane, a Pt:ASC derived from $NH_4$-ASC precursor calcined at 350+C., impregnated with $H_2PtCl_6$ solution, dried at 110°C., and then calcined at 750°C. in air having a Pt:ASC catalyst composition of: 1.1wt.-%Pt, 53.453.4wt.-%$Al_{Al2}O_3$, 45.5wt.-%$SO_4$ produced a 17.5 mole % conversion of cyclohexane to methylcyclopentane at 375°C. and 850 psig.

A Pd:Cr-ASC derived from $NH_4$-Cr-precursor calcined at 700°C. in air, impregnated with palladium acetylacetonate in benzene (benzene removed by vacuum stripping at 25°C.) and calcined at 550°C. in air, which yielded a catalyst composition of: 0.5wt.-%Pd, 16.3wt.-%$Cr_2O_3$, 44.2wt.-%$Al_2O_3$, 39.0wt.-%$SO_4$, produced a 22.8 mole-% conversion of cyclohexane to methylcyclopentane at 375°C. and 620 psig.

An ASC derived from $NH_4$-precursor by calcination at 750°C. in air, which yielded a catalyst composition of: 57.5wt.-%$Al_2O_3$, 42.5wt.-%$SO_4$, produced a 9.4 mole % conversion of cyclohexane to methylcyclopentane at 375°C. and 680 psig.

A Pt:ASC derived from $NH_4$-ASC-precursor calcined at 350°C., impregnated with $H_2PtCl_6$ solution, dried at 110°C., and then calcined at 750°C. in air which yielded a Pt:ASC catalyst composition of: 1.1wt.-%Pt, 53.4wt.-%$Al_2O_3$, 45.5wt.-%$SO_4$, produced a 4.5 mole % conversion of n-hexane to 2-methylpentane and 3-methylpentane at 300°C. and 600 psig.

A Pd:ASC derived from $NH_4$-ASC precursor calcined at 400°C. in air, which was impregnated with aqueous $Pd(NH_3)_4Cl_2$ solution and dried at 110°C. and calcined at 750°C. in air, which yielded a catalyst composition of: 0.9wt.-%Pd, 59.8wt.-%$Al_2O_3$, 39.3wt.-%$SO_4$, produced a 3.4 mole-% conversion of n-hexane to 2-methylpentane and 3-methylpentane at 300°C. and 600 psig.

EXAMPLE 15

In an example of hydrocarbon hydrogenation: A Ni:ASC derived from Ni-ASC-precursor calcined in $H_2$ at 400°C. which yielded catalyst composition of: 14.5wt.-%Ni, 66.2wt.-%$Al_2O_3$, 19.3wt.-%$SO_4$, produced a 70 mole-% conversion of benzene to cyclohexane, methylcyclopentane (MCP) and cyclohexyl compounds at 250°C. and 700 psig $H_2$ pressure. It should be noted that this highly active catalyst employed is inexpensive Ni and not the usual expensive noble metals.

A Pt:Cr-ASC derived from Cr-ASC-precursor which was calcined at 400°C. impregnated with $H_2PtCl_6$ solution, dried at 110°C. and calcined at 750°C. in air, which yielded a catalyst composition of: 0.4% Pt, 19.6% $Cr_2O_3$, 42.4% $Al_2O_3$, 27.5% $SO_4$, produced a 72.4 mole-% conversion of benzene to cyclohexane, MCP, and cyclohexyl compounds at 175°C. and 700 psig $H_2$.

A Pd:Cr-ASC derived from Cr-ASC-precursor which was calcined at 400°C. impregnated with $Pd(NH_3)_4Cl_2$ solution, dried at 110°C., and calcined at 675°D. in air, yielding a catalyst composition of: 0.6wt.-%Pd, 16.1wt.-%$Cr_2O_3$, 44.5wt.-%$Al_2O_3$, 38.8wt.-%$SO_4$, produced a 75.6 mole-% conversion of benzene to cyclohexane, MCP, and cyclohexyl compounds at 175°C. and 700 psig $H_2$ pressure.

EXAMPLE 16

In an example of ethylene alkylation of benzene, a Cr-ASC derived from Cr-ASC-precursor calcined at 675°C. in air, which yielded a catalyst composition of: 21.0wt.-%$Cr_2O_3$, 49.3wt.-%$Al_2O_3$, 29.6wt.-%$SO_4$, produced an 8.5 mole-% conversion of benzene to ethylbenzene and di-ethyl-benzene at room temperature and atmospheric pressure.

EXAMPLE 17

In an example of propylene alkylation of benzene using catalysts other than ASC and Cr-ASC:

A Mo-ASC derived from Mo-ASC-precursor which was calcined at 700°C. in air, which yielded a catalyst composition of: $MoO_3$, 8.1wt.-%, $Al_2O_3$, 51.0wt.-%, $SO_4$ = 40.9 wt.-%, produced a 14.0 mole-% conversion of benzene to isopropylbenzene and di-isoproplybenzene.

A Co-ASC which was derived from Co-ASC-precursor by calcination at 700°C. in air, which yielded a catalyst composition of: CoO = 0.7wt.-%, $Al_2O_3$ = 52.3wt.-%, $SO_4$ = 47.0wt.-%, produced a 34.8 mole-% conversion of benzene to cumene, di-IB, and tri-IB.

A Ni-ASC which was derived from a Ni-ASC-precursor by calcination of same at 750°C. in air, which yielded a catalyst composition of: 0.7wt.-%NiO, 58.7wt.-%$Al_2O_3$, 40.6wt.-%$SO_4$, produced a 38.5 mole-% conversion of benzene to cumene, di-IB, and tri-IB.

A La-ASC which was derived from La-ASC-precursor by calcination of same at 750°C. in air, which yielded a catalyst composition of 2.3wt.-%$LA_2O_3$, 57.7wt.-%$Al_2O_3$, 40.0wt.0% $SO_4$, produced a 40.6 mole-% conversion of benzene to cumene, di-IB, and tri-IB.

A Cu-ASC which was derived from Cu-ASC-precursor by calcination of same at 700°C. in air, which yielded a catalyst composition of 4.3wt.-%CuO, 54.2wt.-%$Al_2O_3$, 39.9wt.-%$SO_4$, on an anhydrous basis, produced a 3.1 mole-% conversion of benzene to cumene.

EXAMPLE 18

In an example demonstrating the synthesis of Ni-ASC-precursor, 999 grams of $Al_2(SO_4)_3 \cdot 18 H_2O$ and 78 grams $NiSO_4 \cdot 6 H_2O$ were dissolved in 1500 cc of $H_2O$ to which 360 grams of $NH_4OH(60\%)$ were then added. The solution was then refluxed for 21 hours and X-ray examination showed that the crystalline product had an X-ray powder diffraction having at least those lines contained in Table I. A chemical analysis of the product phase revealed the following: 5.9wt.-%$(NH_4)_2O$, 32.3wt-%$AL_2O_3$, 0.4 wt.-%NiO and 49.0wt.-%$SO_4$, 12.4 nt.-%$H_2O$.

EXAMPLE 19

In an example demonstrating the synthesis of Co-ASC-percursor, 999 grams of $Al_2(SO_4)_3 \cdot 18 H_2O$ and 84 grams CoSO$_4$·7 H$_2$O were dissolved in 1500 cc of H$_2$O to which 360 grams of NH$_4$OH(60%) were then added. The solution was then refluxed for 21 hours and X-ray examination showed that the crystalline product had an X-ray powder diffraction pattern having at least those lines contained in Table I. A chemical analysis of the product phase revealed the following: 5.9wt.-%(NH$_4$)$_2$O, 32.4Al$_2$O$_3$, 0.3wt.-%CoO, and 49.3wt.-%SO$_4$, 13.1wt.-%H$_2$O.

EXAMPLE 20

In an example demonstrating the synthesis of CuASC-percursor, 999 grams of Al$_2$(SO$_4$)$_3$·18 H$_2$O and 75 grams CuSO$_4$·5H$_2$O were dissolved in 1500 cc of H$_2$O to which 360 grams of NH$_4$OH(60%) were then added. The solution was then refluxed for 21 hours and X-ray examination showed that the crystalline product had an X-ray powder diffraction pattern having at least those lines contained in Table I. A chemical analysis of the product phase revealed the following: 5.9 wt.-%(NH$_4$)$_2$O, 31.3wt.-%Al$_2$O$_3$, 2.3wt.-%CuO, and 47.9wt.-wt.-%SO$_4$, 12.6wt.-%H$_2$O.

EXAMPLE 21

In an example demonstrating the synthesis of LaASC-percursor, 600 grams of Al$_2$O$_3$(SO$_4$)$_3$·18 H$_2$O were dissolved in 600 cc of H$_2$O to which 180 g. of NH OH(60%) were added; 84 g. of LaCl$_3$·6 H$_2$O dissolved in 150 cc of H$_2$O were added. The solution was then refluxed for 21 hours and X-ray examination showed the crystalline product had an X-ray powder diffraction pattern having at least those lines contained in Table I. A chemical analysis of the product phase revealed the following: 5.9$_{wt.-\%(NH4)}$$_2$O, 31.5wt.-%Al$_2$O$_3$, 1.0wt.-%La$_2$O$_3$ and 48.1wt.-%SO$_4$, 13.5wt.-%H$_2$O.

EXAMPLE 22

In an example demonstrating the synthesis of MoASC-precursor, 798 g. of Al$_2$(SO$_4$)$_3$·18 H$_2$O were dissolved in 1500 cc H$_2$O; 87 g. of MoO$_3$ were dissolved in 360 g. of NH$_4$OH (60%) and added to the Al$_2$(SO$_4$)$_3$ solution. The solution was then refluxed for 21 hours and X-ray examination showed that the crystalline product had an X-ray powder diffraction pattern having at least those lines contained in Table I. A chemical analysis of the product phase revealed the following: 5.7wt.-%(NH$_4$)$_2$O, 3.15wt.-%Al$_2$O$_3$, 4.8 wt.-%MoO$_3$ and 44.9wt.-%SO$_4$, 12.6wt.-%H$_2$O.

EXAMPLE 23

In an example demonstrating the synthesis of P-ASC-precursor 1200 g. of Al$_2$(SO$_4$)$_3$·18 H$_2$O and 120 g. of (NH$_4$)$_2$ PO$_4$ were dissolved in 1500 cc of H$_2$O to which 360 g. of NH$_4$OH(60%) were then added. The solution was then refluxed for 21 hours and X-ray examination showed that the crystalline product had an X-ray powder diffraction pattern having at least those lines contained in Table I. A chemical analysis of the product phase revealed the following: 7.0wt.-%(NH$_4$)$_2$O, 31.8wt.-%Al$_2$O$_3$, 9.5wt.-%PO$_4$ and 40.3wt.-%SO$_4$, 11.4wt.-%H$_2$O.

EXAMPLE 24

In an example demonstrating the synthesis of Tl-ASC-precursor 33.3 g. of Al$_2$(SO$_4$)$_3$·18 H$_2$O and 2.5 g. Tl$_2$SO$_4$ were dissolved in 100 g. H$_2$O to which 12.0 g. NH$_4$OH(60%) were then added. The solution was digested at 100°C. for 21 hours in a sealed glass jar and X-ray examination showed that the crystalline product had an X-ray powder diffraction pattern having at least those lines contained in Table I. A chemical analysis of the product phase revealed the following: 5.2wt.-%Il$_2$O and 47.1wt.-%SO$_4$, 9.4wt.-%H$_2$O.

EXAMPLE 25

In an example demonstrating the synthesis of Si-ASC-precursor 1200 g. of Al$_2$(SO$_4$)$_3$·18 H$_2$O were dissolved in 1500 cc of H$_2$O to which 125 g. of ethylorthosilicate, Si (OC$_2$H$_5$)$_4$ and 360 g. NH$_4$OH (60%) were then added. The solution was then refluxed for 21 hours and X-ray examination showed that the crystalline product had an X-ray diffraction pattern having at least those lines contained in Table I. A chemical analysis of the product phase revealed the following: 5.5wt.-%(NH$_4$)$_2$O, 30.1wt.-%Al$_2$O$_3$, 5.8wt.-%SiO$_2$ and 44.5wt.-%SO$_4$, 14.1wt.-%H$_2$O.

EXAMPLE 26

In an example demonstrating the synthesis of FeASC-precursor 33.3 g. of Al$_2$(SO$_4$)$_3$·18 H$_2$O and 9.6 g. of FeNH$_4$(SO$_4$)$_2$·12H$_2$O were dissolved in 100 g. of H$_2$O to which 12.0 g. of NH$_4$OH(60%) were added. The solution was digested at 100°C. for 21 hours in a sealed glass jar and X-ray examination showed that the crystalline product had an X-ray powder diffraction pattern having at least those lines contained in Table I. A chemical analysis of the product phase revealed the following: 6.0wt.%(NH$_4$)$_2$O, 28.4wt.-%Al$_2$O$_3$, 7.5wt.-%Fe$_2$O$_3$ and 48.8wt.-%SO$_4$, 9.3wt.-%H$_2$O.

EXAMPLE 27

In another example of this invention, wherein a precursor phase was developed devoid of ammonium ion, and at high synthesis temperature, 90 g. of Al$_2$(SO$_4$)$_3$·18 H$_2$O were dissolved in 112 g. of H$_2$O. The overall molar composition of the resulting solution was, in terms of the component oxides: 3.0 Al$_2$O$_3$·9.0 SO$_3$· and approximately 150 H$_2$O and had a pH value less than 4.5. The solution was digested at 175°C. and autogeneous pressure in a teflon-lined steel pressure vessel for 24 hours. The solid product was separated from the liquor by filtration, washed with H$_2$O, dried at 110°C. X-ray analysis of a portion of this sample showed that the crystalline product had an X-ray powder diffraction pattern having at least those lines contained in Table I. Chemical analysis showed the following composition: Al$_2$O$_3$=38.4wt.-%SO$_4$=47.4$_{wt.-\%H2}$O=14.2wt.-%, the molar ratio SO$_4$/Al$_2$O$_3$ being 1.314. The charge-compensating cation in this material may be H$^+$ or H$_{30}^+$ replacing NH$_4^+$.

EXAMPLE 28

In another example of this invention demonstrating the development of a micropore structure in ASC of less than 20 A, samples of NH$_4$-ASC-precursor were calcined at various temperatures which produced amorphous materials of varied chemical composition (SO$_4$/Al$_2$O$_3$=O → 1.4). The surface areas of the calcined materials were determined by the B-E-T method using N$_2$ as the adsorbate at −196°C. The capacity of these materials for the adsorption of neopentane (2,2 dimethylpropane) at 25°C. was also determined in a gravimetric McBain-Bakr adsorption apparatus. The development of large pore volume is indicated by the adsorption of neopentane. Neopentane has a kinetic diameter similar to benzene of approximately 6 Å, and the adsorption of this molecule indicates the capacity these catalysts have to adsorb and activate hydrocarbon molecules. It should be noted that the development of a micropore structure and the resulting high surface area is concomitant with the development of the ASC chemical composition necessary for catalytic activity. At temperatures greater than about 800°C. sulfate is rapidly decomposed, thereby reducing catalytic activity for the alkylation reaction. Enlarged pore structures and surface areas are generated at temperatures above 800°C. The following table demonstrates these effects.

tion showed this material to be substantially amorphous with traces of poorly crystalline $\gamma$-$Al_2O_3$. It had a B-E-T $N_2$ surface area of 125 m²/g and a chemical composition of 0.2wt.-%Pt, 96.7wt.-%$Al_2O_3$ and 3.1wt.-%$SO_4$.

About 7 g of the above Pt-loaded AAB composition were placed in quartz boat and reduced in a stream of $H_2$ at 500°C. for 2 hours in a tube furnace and then tested for catalytic activity in the dehydrogenation of n-docosane as follows: About 5 g of the reduced catalyst composition were placed in a pyrex reactor with 46.6 g of n-docosane and heated to about 330°C. with

| Calcination Temperature | BET $N_2$S.A., Meters²/g. | Neopentane Adsorption, (large pore development wt.-% adsorbed) | $SO_4/Al_2O_3$ Mole Ratio | Benzene-Propylene Alkylation $C_6H_6$ Conversion mole-% |
|---|---|---|---|---|
| 550°C. | 12 | 0.2 | 1.33 | 0 |
|  | 44 | — | 0.86 | 19.2 |
| 700°C. |  |  |  |  |
| 725°C. | 54 | 2.8 | 0.72 | 38.9 |
| 750°C. | 71 | 3.3 | 0.62 | 50.3 |
| 800°C. | 125 | 5.9 | 0.35 | 43.1 |
| 850°C. | 135 | 6.0 | 0.16 | 8.7 |
| 900°C. | 123 | 5.3 | 0.03 | 0 |

EXAMPLE 29

In an example demonstrating the synthesis of a multicomponent precursor, namely $NH_4$-P-Si-precursor, about 1200 grams of $Al_2(SO_4)_3 \cdot 18H_2O$ were dissolved in about 1500 cc of distilled $H_2O$ to which 125 grams of ethylorthsilicate and 120 grams of $(NH_4)_2 HPO_4$ were then added. Thereafter 360 grams of $NH_4OH(29\%NH_3)$ were added to the solution and the resultant solution was refluxed with stirring for 21 hours. The solid reaction product was separated by filtration, washed with about 2 liters of distilled $H_2O$ and then dried at about 110°C. for 6 hours. The synthesis oxide composition was 8.0 $(NH_4)_2O \cdot 3 \cdot Al_2O_3 \cdot 9.0\ SO_3 \cdot 1.5\ PO_4 \cdot 2.0\ SiO_2 \cdot 160\ H_2O$. X-ray examination showed that the crystalline product had an X-ray powder diffraction pattern having at least those lines contained in Table I. A chemical analysis of the product phase revealed the following: 7.1wt.-%$(NH_4)_2O$, 30.8wt.-%$Al_2O_3$, 32.6wt.-%$SO_4$, 12.2wt.-%$PO_4$, 6.9wt.-%$SiO_2$, 10.4wt.-%$H_2O$.

EXAMPLE 30

In an example demonstrating the catalytic activity in dehydrogenation of n-docosane of a platinum-loaded AAB composition of this invention, about 1800 g of $Al_2(SO_4)_3 \cdot 18H_2O$ were dissolved in about 2250 cc of distilled $H_2O$ and about 540 g of $NH_4OH$ (29% $NH_3$) added to the solution. The resultant solution was refluxed with stirring for about 21 hours. The solid product was separated by filtration, washed with about 2 litres of distilled $H_2O$ and dried at about 110°C. for 6 hours. X-ray examination showed that the crystalline product had a typical X-ray powder diffraction pattern as disclosed in Table I.

About 75 g of the above crystalline precursor were calcined at 850°C. for 3 hours with an air purge. About 33 g of the calcined material were slurried in 150 cc of $H_2O$ and while stirring were titrated with 50 cc of $H_2PtCl_6$ solution containing 0.8 g of $H_2PtCl_6$. The slurry was filtered using a Buchner funnel and the filter cake washed with about 100 cc of distilled $H_2O$. The filter cake was dried at 110°C. for 3 hours. X-ray examinaa nitrogen purge. The catalyst-paraffin slurry was maintained at 330°C. for one hour and then cooled to 80°C. and sampled. A 6.8% conversion of the n-docosane to unsaturates was indicated by $KBr$-$KBrO_3$ Bromine No. titration.

EXAMPLE 31

In an example of this invention which demonstrates the inactivity of a synthetic K-phase structurally related to alunite, a solution containing 27 grams of KOH in 250 cc of $H_2O$ was added to a solution containing 153 grams of $K_2Al_2(SO_4) \cdot 24\ H_2O$ in 1500 cc of $H_2O$ and the mixture was stirred. A precipitate formed. The solution and precipitate were placed in a teflon-line sealed glass vessel and held at 90°C. for 23 hours. A solid product was filtered, washed with water and dried at 110°C. The molar composition of the reactant mixture in terms of the component oxides was 2.25 $K_2O \cdot Al_2O_3 \cdot 4SO_3 \cdot 632\ H_2O$. X-ray analysis showed that the crystalline product and an X-ray diffraction pattern shown in Table II under "Synthetic K-phase." Chemical analysis gave the following molar oxide composition: $K_2O \cdot 2.5Al_2O_3 \cdot 4.3\ SO_4 \cdot 6.3\ H_2O$.

A portion of the above material was treated with 40 cc of 2N hCl (300% excess) for 2.5 hours at ambient temperature in an attempt to remove the potassium ions. The treated material was then filtered, washed with water, dried at 110°C. and calcined in air for 2 hours at 750°C. X-ray diffraction analysis of the calcined mass showed that it contained $KAl\ (SO_4)_2$. Chemical analysis showed the following composition: $K_2O$=16.3 weight per cent, $Al_2O_3$=47.6 weight per cent, $SO_4$=41.7 weight-per cent, the molar ratio $SO_4/Al_2O_3$ being 0.93. A 10-gram portion of this material was tested in the benzene-propylene alkylation reaction and found to be inactive.

EXAMPLE 32

In another example of this invention wherein sodium is introduced into an alunite-type phase, a series of gels was prepared by precipitation of an $Al_2(SO_4)_3 \cdot 18\ H_2O$ solution by titrating with $NH_4OH$ to pH=7.5. The precipitate was filtered, washed with water and manually mixed with sulfuric acid and sodium hydroxide dissolved in water. The resultant gels were placed in teflon-line glass jars and digested at 100°C. for 21 hours. The solid products were filtered, washed with water and dried at 100°C.

The weights of reagents used in the above procedure were as follows: $Al_2(SO_4)_3 \cdot 18\ H_2O$, 30.0 grams; $H_2SO_4$(90%), 6.0 grams; $NH_4OH$ (60%), 0.9 grams; $NaOH$, 0.6 grams; $H_2O$ 75 grams. The molar composition of this reactant mixture was in terms of component molar oxides: 0.5 $(NH_4)_2O \cdot 0.5Na_2O \cdot 3\ Al_2O_3 \cdot 4SO_3$. greater than 280 $H_2o$.

Four separate preparations were made according to the foregoing procedure. The four products were combined into one lot and X-ray analysis of a sample of this lot showed the following X-ray powder diffraction pattern characteristic of a material structurally related to alunite:

| d-A | I/I max × 100 |
|---|---|
| 5.68 | 6 |
| 4.93 | 72 |
| 3.51 | 25 |
| 2.99 | 100 |
| 2.83 | 4 |
| 2.25 | 11 |
| 2.22 | 5 |
| 1.90 | 30 |
| 1.75 | 20 |
| 1.65 | 5 |

Chemical analysis showed the following molar oxide composition: 0.6 $(NH_4)_2O \cdot 0.4Na_2O \cdot 3.0\ Al_2O_3 \cdot 4.5\ SO_4 \cdot 6.7\ H_2O$. A sample of the above material was calcined in air at 700°C. for 2 hours. X-ray diffraction analysis of a sample of the calcined material showed that it was amorphous with a slight trace of a crystalline impurity [POSSIBLY $AL_2(SO_4)_3$]. Chemical analysis showed the following composition: $(NH_4)_2O$= less than 0.1 weight-per cent, $Na_2O$=4.4 weightper cent, $Al_2O_3$=62.7 weight-per cent, $SO_4$=38.0 weightper cent, the molar ratio $SO_4/Al_2O_3$ being 0.64. The surface area as measured by the standard B-E-T $N_2$ analysis was 23 meters$^2$ per gram.

In an evaluation of catalytic activity the alkylation of benzene with propylene was conducted and the sample material was found to be inactive (less than 1.0 per cent conversion of benzene in 1 hour).

EXAMPLE 33

In an example demonstrating the catalytic activity in dehydrogenation of n-docosane of a palladium loaded AAB composition, about 75 g of crystalline precursor as described in Example 1 were calcined at 850°C. for 3 hours with an air purge. About 34 g of the calcined material were slurried in 150 cc of $H_2O$ and while stirring were titrated with 50 cc of $Pd(NH_3)_4Cl_2$ solution containing 0.34 g of $Pd(NH_3)_4Cl_2$. The slurry was filtered using a Buchner funnel and the filter cake washed with about 100 cc of $H_2O$. This solid filtered product was dried at 110°C. for 3 hours. Chemical analysis disclosed the following: 0.1wt.-%Pd, 97.8wt-%$Al_2O_3$ and 2.1wt.-%$SO_4$.

About 7 g of the above prepared Pd-loaded AAB composition were placed in a quartz boat in a tube furnace and reduced in a stream of $H_2$ at 500°C. for 2 hours. This Pd:AAB composition was tested for catalytic activity in the dehydrogenation of n-docosane as follows: about 5 g of the reduced Pd:AAB composition were placed in a pyrex reactor with 46.6 g of n-docosane and heated to about 330°C. with a nitrogen purge. The catalyst-paraffin slurry was maintained at 330°C. for 1 hour, cooled to 80°C., and sampled. A 6.0% conversion of n-docosane to unsaturated hydrocarbons was indicated by KBr-KBrO$_3$ Bromine No. titration, and less than 1% aromatics was detected in the product.

EXAMPLE 34

In an example demonstrating the catalytic activity in dehydrogenation of n-docosane of Fe-substituted AAB composition, about 600 g of $Al_2(SO_4)_3 \cdot 18H_2O$ were dissolved with 867 g of $FeNH_4(SO_4)_2 \cdot 12H_2O$ in about 1500 cc of distilled $H_2O$ and about 360 g of $NH_4OH$ (29% $NH_3$) added to the solution. The resultant solution was refluxed with stirring for 21 hours, and solid reaction products filtered out and washed with about 2 liters of distilled $H_2O$ and dried at about 100°C. for 6 hours. X-ray examination showed that the crystalline product had a typical X-ray diffraction pattern as disclosed in Table I. Chemical analysis revealed the following 5.6wt.-%$(NH_4)_2O$, 15.4wt.-%$Al_2O_3$, 25.2wt.-%$Fe_2O_3$, 45.7wt.-%$SO_4$ and 8.1wt.-%$H_2O$ and a molar oxide composition of: $(NH_4)_2O \cdot 1.4\ Al_2O_3 \cdot 1.5\ Fe_2O_3 \cdot 4.4\ SO_4 \cdot 4.2\ H_2O$; $SO_4/M_2O_3$=1.54, wherein $M_2O_3$ represents $Al_2O_3 + Fe_2O_3$.

About 100 g of the above crystalline precursor phase was calcined at 800°C. for 2 hours with air purge and yielded a product with the following chemical composition:

57.1wt.-%$Fe_2O_3$, 35.4wt.-%$Al_2O_3$; 7.4wt.-%$SO_4$, with a B-E-T $N_2$ surface area of 42 m$^2$/g.

About 7 g of the above calcined Fe-AAB composition were placed in a quartz boat in a tube furnace and reduced in a stream of $H_2$ at 500°C. for 3 hours, and tested for catalytic activity in the dehydrogenation of n-docosane as follows: about 5 g of the reduced Fe-AAB composition were placed in a pyrex reactor with 46.6 g of n-docosane and heated to about 330°C. with a nitrogen purge. The catalyst-paraffin slurry was maintained at about 330°C. for one hour and then cooled to 80°C. and sampled. A 4.7% coversion of n-docosane to unsaturated hydrocarbons was indicated by KBr-KBrO$_3$ Bromine No. titration. It should be noted that this example demonstrates activity comparable to that of noble metal-containing catalysts.

EXAMPLE 35

In an example demonstrating the catalytic activity in dehydrogenation of n-docosane of a platinum-loaded Cr-AAB composition, about 1197 g of $Al_2(SO_4)_3 \cdot 18H_2O$ and 500 g $Cr_2(SO_4)_3 \cdot 5H_2O$ were dissolved in about 2250 cc of distilled $H_2O$ and about 540 g of $NH_4OH$ (29% $NH_3$) were added to the solution. The resultant solution was refluxed with stirring for about 21 hours. The solid product was separated by filtration, washed with about 2 liters of distilled $H_2O$ and dried at about 110°C. for 6 hours. X-ray examination showed that the crystalline product had a typical X-ray powder diffraction pattern as disclosed in Table I.

About 150 g of the above crystalline precursor were calcined at 850°C. for 5 hours with an air purge. About 27 g of the calcined material were slurried in 150 cc of $H_2O$ and while stirring were titrated with 25 cc of $H_2PtCl_6$ solution containing 0.36 g of $H_2PtCl_6$. The slurry was filtered using a Buchner funnel and the filter cake washed with about 100 cc of distilled H₂O. The filter cake was dried at 110°C. for 3 hours. X-ray examination showed this material to be substantially amorphous with traces of poorly crystalline Cr₂O₃. It had a chemical composition of 0.2wt.-%Pt, 70.8wt.-%Al₂O₃, 27.2wt.-%Cr₂O₃ and 1.8wt.-%SO₄.

About 7 g of the above Pt-loaded composition were placed in a quartz boat and reduced in a stream of H₂ at 500°C. for 2 hours in a tube furnace and then tested for catalytic activity in the dehydrogenation of n-docosane as follows about 5 g of the reduced catalyst were placed in a pyrex reactor with 46.6 g of n-docosane heated to about 330°C. with a nitrogen purge. The catalyst-paraffin slurry was maintained at 330°C. for 1 hour and then cooled to 80°C. and sampled. An 8.0% conversion of the n-docosane to unsaturates was indicated by KBr-KBrO₃ Bromine No. titration.

EXAMPLE 36

In another example of this invention demonstrating hydrocarbon dehydrogenation capacities of selected AAB oxide compositions, the following alunite-type crystalline precursors were prepared and calcined at 800°–850°C. in air as follows: (a) $NH_4$; (b) $NH_4$, Fe; (c) $NH_4$, Co; (d) $NH_4$, Cu; (e) $NH_4$, Ni; (f) $NH_4$, Cr. Compositions (a) and (b) were anion-or cation-exchanged with the appropriate platinum or palladium compounds and reduced in hydrogen at 500°C. to incorporate nobel metal into those compositions. When the above compositions were contacted with n-docosane ($C_{22}H_{46}$) at 330°C. for 2 hours, conversions to unsaturate products ranging from 2.1 to 8.0 per cent were obtained.

EXAMPLE 37

In another example demonstrating the synthesis of a multi-component AAB oxide, derived from $NH_4$-Cr-Fe precursor, about 337 grams of $Fe_2(SO_4)_3 \cdot 9\ H_2O$, 800 grams of $Al_2(SO_4)_3 \cdot 18\ H_2O$, and 66 grams of $Cr_2(SO_4)_3 \cdot 5\ H_2O$ were dissolved in about 1500 cc of distilled H₂O to which was then added 360 grams of $NH_4OH$ (29% $NH_3$). The solution was refluxed with stirring for 21 hours. The solid product was separated by filtration, washed with about 2 liters of distilled H₂O, and then dried at about 110°C. for 6 hours. The synthesis oxide composition was: 5.0 $(NH_4)_2O \cdot 1.0Fe_2O_3$ 2.0 $Al_2O_3 \cdot 0.2\ Cr_2O_3 \cdot 9.6\ SO_3 \cdot \sim 160\ H_2O$. X-ray examination showed that the crystalline product had an X-ray powder diffraction pattern having at least those lines contained in Table I. A chemical analysis of the product phase revealed the following: 5.9wt.-%(NH₄)₂O; 2.4wt.-%Cr₂O₃; 19.4wt.-%Al₂O₃; 17.0wt.-%Fe₂O₃; 46.9wt.-%SO₄; 8.4wt.-%H₂O. About 500 g of the above crystalline precursor were calcined at 900°C. for 3 hours in air. About 226 g of the calcined material were then impregnated with 250 cc of K₂CO₃ solution containing 59 g of anhydrous K₂CO₃. The water was removed by drying at 150°C. The catalyst was again calcined, this time at 750°C. for 1 hour in air. A chemical analysis of the catalyst revealed the following: 11.2st.-%k₂O, 5.6wt.-%Cr₂O₃, 38.6wt.-%Fe₂O₃, 44.0wt.-%Al₂O₃, <0.5wt.-%So₄ on an anhydrous basis.

The above catalyst material was tested for activity in the dehydrogenation of ethylbenzene to styrene at 600°C., at atmospheric pressure, with a stem/ethylbenzene mole ratio of about 17 in a spacetime value of about 0.55 seconds. The catalyst produced a 37.0% singlepass conversion of ethylbenzene to styrene and an overall efficiency of 90.4% of reacted ethylbenzene to styrene.

EXAMPLE 38

In an example of this invention demonstrating preparation of a vanadium-containing AAB composition, the crystalline precursor was first prepared from $Al_2(SO_4)_3$, $VOSO_4$ and water, then calcined at 800°C. The amorphous product had the following chemical composition: $Al_2O_3$=75.7wt.-%$O_2O_5$=23.8wt.-% $SO_4$=<0.5wt.-%.

EXAMPLE 39

In an example of this invention which demonstrates the preparation of a Mo-containing AAB oxide composition, 798 grams of $Al_2(SO_4)_3 \cdot 18H_2O$ were dissolved in 1500 cc of water. To this were added 360 grams of $NH_4OH$ (60%) containing 87 g of $MoO_3$. The overall molar composition of the resulting mixture was, in terms of component oxides: 5.0 $(NH_4)_2O \cdot 2.0\ Al_2O_3 \cdot 1.0\ MoO_3 \cdot 6.0\ SO_3$. approximately 150 H₂O. This slurry was digested at 100°C. under reflux conditions for 21 hours. The solids were separated from the liquor by filtration, washed with water and dried at 110°C. X-ray analysis of a sample indicated that the crystalline product had an X-ray powder diffraction pattern having at least those lines contained in Table I. Chemical analysis gave the following molar oxide composition: 1.0 $(NH_4)_2O \cdot 2.8\ Al_2O_3 \cdot 0.3\ MoO_4 \cdot 4.2\ SO_4 \cdot 6.4\ H_2O$. A portion of the above material was calcined in air at 800°C. for 2 hours. X-ray diffraction analysis showed the sample to be essentially amorphous with no evidence of the crystalline precursor phase. Chemical analysis showed the following composition: $Al_2O_3$=84.7wt.-%, $MoO_3$=11.8wt.-%, $SO_4$=<0.5wt.-%.

EXAMPLE 40

In an example of this invention which demonstrates the preparation of a U-containing AAB oxide composition, 1000 grams of $Al_2(SO_4)_3 \cdot 18\ H_2O$ and 252 grams of $UO_2SO_4 \cdot 3H_2O$ were dissolved in 1500 cc of water. To this was added 360 grams of $NH_4OH$ (60%). The overall molar composition of the resulting mixture was in terms of component oxides: 5.0 $(NH_4)_2O \cdot 2.5 \cdot Al_2O_3 \cdot 1.0\ UO_2 \cdot 8.5\ SO_3$·approximately 150 H₂O. This slurry was digested at 100°C. under reflux conditions for 21 hours. The solids were separated from the liquor by filtration, washed with water and dried at 110°C. X-ray analysis of a sample indicated that the crystalline product had an X-ray powder diffraction pattern having at least those lines contained in Table I. Chemical analysis gave the following composition: 6.0wt.-(NH₄)₂O, 33.8wt.-%Al₂O₃, 0.5wt.-%U, 49.0wt.-%SO₄, 10.7wt.-%H₂O. A portion of the above material was calcined in air at 850°C. for 3 hours. X-ray diffraction analysis showed the sample to be essentially amorphous with no evidence of the crystalline precursor phase. Chemical analysis showed the following composition: $Al_2O_3$=92.3wt.-%, U=1.1wt.-%$SO_4$=6.6wt.-%.

What is claimed is:

1. Process for preparing catalyst compositions which comprises providing an aqueous reaction mixture having a composition expressed in terms of mole ratios of oxides as $q$ G₂O : $a$ Al₂O₃ : $b$ M₂O₃ ; $c$ SO₄ ; $d$ XO₄ ; $e$ H₂O wherein "G" represents at least one cation selected from the group consisting of $NH_4^+$, $H^+$ and $Ag^+$, and wherein M₂O₃ represents at least one oxide selected from the group consisting of $Fe_2O_3$, $Cr_2O_3$, $V_2O_3$, $La_2O_3$ and $Ce_2O_3$; $XO_4$ represents at least one oxide selected from the group consisting of $PO_4$, $MoO_4$, $VO_4$. $SiO_4$ and $TlO_4$; $q$ has a value of from 0.5 to 6.0; $a$ has a value of from 1.5 to 4.0; $b$ has a value of from zero to 2.0; $c$ has a value of from 8.0 to 10.0; $d$ has a value of from zero to 2.0: $e$ has a value of from 100 to 1,000; the sum of $a + b$ has a value not exceeding 4.0; establishing the pH of said reaction mixture in the range of 1.5 to 4.5, digesting said aqueous reaction mixture within a temperature range of from about 80° to about 200°C. for a period of from at least 4 hours to a period sufficient to complete crystallization, recovering the crystalline reaction product, and calcining the crystalline reaction product at a temperature of from 550°C. to 900°C.

2. Process according to claim 1 wherein the crystalline reaction product is calcined for from 2 to 4 hours at a temperature of from 700°C to 800°C.

* * * * *